(12) United States Patent
Ma et al.

(10) Patent No.: US 11,196,962 B2
(45) Date of Patent: Dec. 7, 2021

(54) METHOD AND A DEVICE FOR A VIDEO CALL BASED ON A VIRTUAL IMAGE

(71) Applicant: SHANGHAI ZHANGMEN SCIENCE AND TECHNOLOGY CO., LTD., Shanghai (CN)

(72) Inventors: Xiaojie Ma, Shanghai (CN); Chenpeng Hu, Shanghai (CN)

(73) Assignee: SHANGHAI ZHANGMEN SCIENCE AND TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/931,419

(22) Filed: Jul. 16, 2020

(65) Prior Publication Data

US 2020/0351471 A1    Nov. 5, 2020

Related U.S. Application Data

(63) Continuation of application No. PCT/CN2018/125601, filed on Dec. 29, 2018.

(51) Int. Cl.
- *H04N 7/14* (2006.01)
- *G06K 9/00* (2006.01)
- *G06T 13/40* (2011.01)

(52) U.S. Cl.
CPC ......... *H04N 7/147* (2013.01); *G06K 9/00302* (2013.01); *G06T 13/40* (2013.01)

(58) Field of Classification Search
CPC ........ H04N 7/147; H04N 7/141; H04N 7/157; H04N 7/15; G06K 9/00302; G06K 9/00315; G06K 9/00355; G06T 13/40; G06T 11/60; G06T 7/246; G06T 2207/30201; G06F 3/0488; G06F 3/04842; G06F 2203/011; H04M 1/72427
See application file for complete search history.

(56) References Cited

U.S. PATENT DOCUMENTS

2014/0267342 A1    9/2014    Liu
2015/0365627 A1    12/2015    Deng et al.

FOREIGN PATENT DOCUMENTS

| CN | 101677386 A | | 3/2010 |
|---|---|---|---|
| CN | 101931621 A | | 12/2010 |
| CN | 102455898 A | | 5/2012 |
| CN | 103368929 A | | 10/2013 |
| CN | 103647922 A | | 3/2014 |
| CN | 103916621 A | * | 7/2014 |
| CN | 103916621 A | | 7/2014 |
| CN | 105407313 A | * | 3/2016 |
| CN | 106331572 A | | 1/2017 |
| CN | 108377356 A | | 8/2018 |

* cited by examiner

*Primary Examiner* — Yogeshkumar Patel
(74) *Attorney, Agent, or Firm* — Kilpatrick Townsend & Stockton, LLP

(57) ABSTRACT

An objective of the present application is to provide a method and a device for a video call based on a virtual image. Compared with the prior art, the present application obtains first video information, and replaces a video portrait in the first video information with a virtual image, to determine second video information containing the virtual image. In this way, pleasure of communication can be increased and communication effect can be improved by using the virtual image in the video call, and thereby use experience of a user is enhanced and enriched.

17 Claims, 1 Drawing Sheet

METHOD AND A DEVICE FOR A VIDEO CALL BASED ON A VIRTUAL IMAGE

CROSS REFERENCE TO THE RELATED APPLICATION

Figure 1:
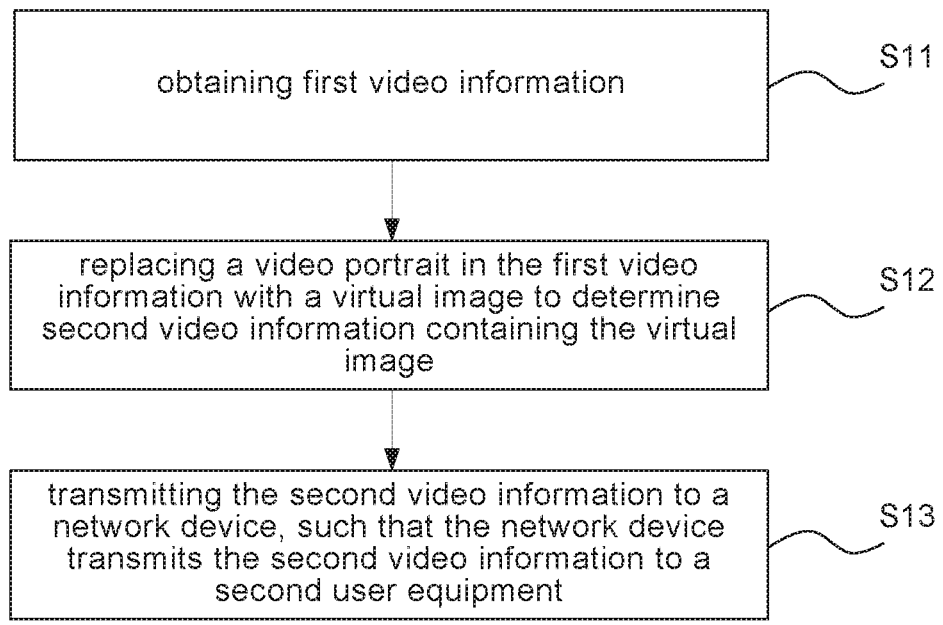

This application is the continuation application of International Application No. PCT/CN2018/125601, filed on Dec. 29, 2018, which is based upon and claims priority to Chinese Patent Application No. 201810050161.X, filed on Jan. 18, 2018, the entire contents of which are incorporated herein by reference.

FIELD

The present application relates to the field of communication technology, and more specifically to a technology for a video call based on a virtual image.

BACKGROUND

Video calls can help people thousands of miles apart to achieve face-to-face real-time exchange interaction. In the prior art, people replace their avatars in videos with static pictures in whole, or add video pendants to their own video avatars. This is disadvantageous to protection of user privacy, and also reduces interest of communication to a large extent.

SUMMARY

An objective of the present application is to provide a method and a device for a video call based on a virtual image.

According to one aspect of the present application, a method for a video call based on a virtual image at a first user equipment is provided. The method comprises:
obtaining first video information, wherein the first video information comprises a video portrait for a first user;
replacing the video portrait in the first video information with a virtual image to generate second video information containing the virtual image; and
transmitting the second video information to a network device, and the network device transmits the second video information to a second user equipment corresponding to a first user.

Further, replacing the video portrait in the first video information with the virtual image comprises:
when a trigger condition is met, replacing the video portrait in the first video information with the virtual image.

Further, the trigger condition comprises at least one of:
obtaining instruction information on local replacement;
a device condition reaching a preset value; and
workload of replacing the video portrait being below a threshold.

Further, the method also comprises:
transmitting a replacement request to the network device, and the network device replaces a video portrait in video information sent by the second user equipment with a virtual image based on the replacement request; and
receiving the video information of the second user equipment after replacement which is sent by the network device.

Further, before replacing the video portrait in the first video information with the virtual image, the method further comprises:
determining the virtual image.

Further, determining the virtual image comprises:
determining the virtual image based on the user's selection operation.

Further, determining the virtual image comprises:
detecting emotional information of the video portrait; and
determining the virtual image based on the emotional information.

Further, replacing the video portrait in the first video information with the virtual image comprises:
obtaining video frames of the first video information;
detecting the video portrait in the video frames; and
replacing the video portrait in the video frames with the virtual image.

Further, real-time motion information is determined.
Further, replacing the video portrait in the first video information with the virtual image comprises:
obtaining video frames of the first video information;
detecting real-time motion information of the video portrait in the video frames; and
replacing the video portrait in the video frames with a virtual image which matches the real-time motion information.

Further, the method also comprises:
detecting difference information between real-time motion information in a subsequent frame and in a previous frame of the video frames;
wherein replacing the video portrait in the video frames with the virtual image which matches the real-time motion information comprises:
generating a virtual image for the video portrait in the subsequent frame based on the difference information and the virtual image after replacement in the previous frame.

According to another aspect of the present application, a method for a video call based on a virtual image at a network device is also provided. The method comprises:
obtaining first video information sent by a first user equipment, wherein the first video information comprises a video portrait for a first user corresponding to the first user equipment;
replacing the video portrait in the first video information with a virtual image to generate second video information containing the virtual image; and
transmitting the second video information to a second user equipment.

Further, the method also comprises:
receiving a replacement request sent by the first user equipment; and
replacing a video portrait in video information sent by the second user equipment with a virtual image based on the replacement request.

Further, before replacing the video portrait in the first video information with the virtual image, the method further comprises:
determining the virtual image.

Further, determining the virtual image comprises:
determining the virtual image based on the user's selection operation.

Further, determining the virtual image comprises:
detecting emotional information of the video portrait; and
determining the virtual image based on the emotional information.

Further, replacing the video portrait in the first video information with the virtual image comprises:
obtaining video frames of the first video information;
detecting the video portrait in the video frames; and
replacing the video portrait in the video frames with the virtual image.

Further, replacing the video portrait in the first video information with the virtual image comprises:

obtaining video frames of the first video information;

detecting real-time motion information of the video portrait in the video frames; and replacing the video portrait in the video frames with a virtual image which matches the real-time motion information.

Further, the method also comprises:

detecting difference information between real-time motion information in a subsequent frame and in a previous frame of the video frames;

wherein replacing the video portrait in the video frames with the virtual image which matches the real-time motion information comprises:

generating a virtual image for the video portrait in the subsequent frame based on the difference information and the virtual image after replacement in the previous frame.

Compared with the prior art, the present application obtains first video information, and replaces a video portrait in the first video information with a virtual image, to determine second video information containing the virtual image. In this way, pleasure of communication can be increased and communication effect can be improved by using the virtual image in the video call, and thereby use experience of a user is enhanced and enriched.

Moreover, in the present application, emotional information of the video portrait may also be detected, and the virtual image may be determined based on the emotional information. In this way, virtual images which match users' emotions can be determined for users, and the users can express their emotions better in the video call and feel emotional states of both parties. This brings them closer to each other and achieves better communication effect.

In addition, in the present application, a virtual image for a counterpart party of the video call may also be selected and set, and the network device replaces the video portrait for the counterpart party of the video call with a virtual image which a user of a local terminal wishes after obtaining video information for the counterpart party. This enables the user of the local terminal to watch the virtual image which he/she favors and achieves better user experience.

DESCRIPTIONS OF THE DRAWINGS

Figure 2:
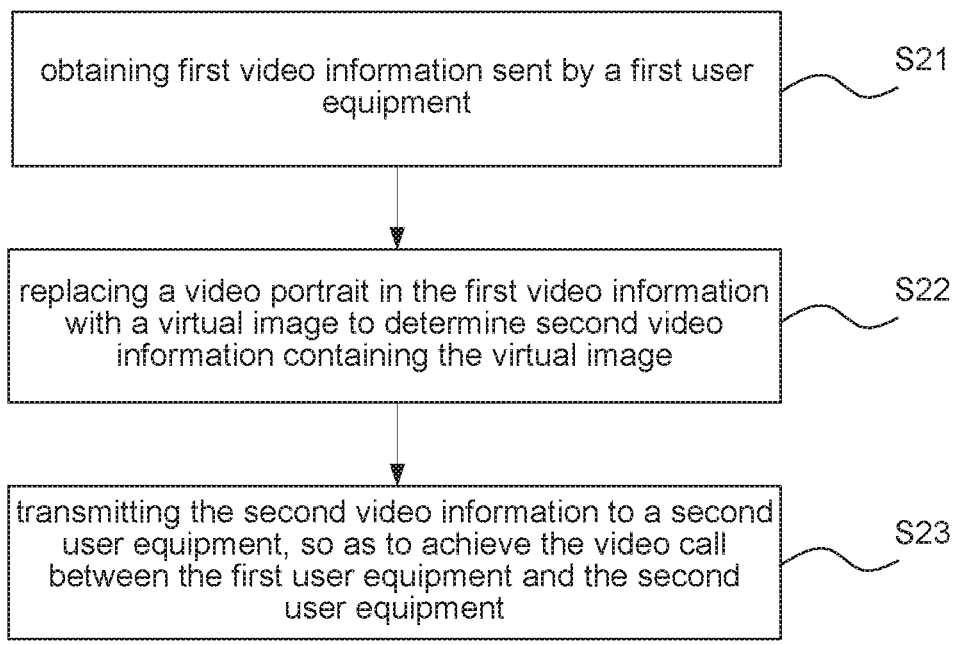

Other features, objects, and advantages of the present disclosure will become more apparent by reading the detailed description of non-limiting embodiments with reference to the following drawings:

FIG. 1 shows a flowchart of a method for a video call based on a virtual image at a first user equipment according to one aspect of the present application; and FIG. 2 shows a flowchart of a method for a video call based on a virtual image at a network device according to another aspect of the present application.

The identical or similar reference numerals in the drawings represent the identical or similar components.

DETAILED EMBODIMENTS

The disclosure is further described in detail below with reference to the accompanying drawings.

In a typical configuration of the present application, a terminal, a device of a service network and a trusted party all include one or more processors (CPUs), an input/output interface, a network interface and a memory.

The memory may include a non-permanent memory, a random access memory (RAM) and/or a non-volatile memory and the like in a computer-readable medium, such as a read-only memory (ROM) or a flash memory (flash RAM)). A memory is an example of a computer-readable medium.

A computer-readable medium comprises permanent and non-permanent, movable and non-movable media and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and a carrier.

FIG. 1 shows a method for a video call based on a virtual image at a first user equipment according to one aspect of the present application. The method comprises:

S11, obtaining first video information, wherein the first video information comprises a video portrait for a first user;

S12, replacing the video portrait in the first video information with a virtual image to generate second video information containing the virtual image; and S13, transmitting the second video information to a network device, and the network device transmits the second video information to a second user equipment corresponding to a second user, to achieve the video call between the first user equipment and the second user equipment. In the present application, user equipments include devices for achieving a video call and conducting information interaction with a network device. For example, user equipments include but are not limited to any type of mobile electronic product for human-machine interaction with users via touchpads, for example, a smart phone, a tablet, etc. The mobile electronic product can adopt any operating system, such as android operating system, iOS operating system, etc.

Network devices include but are not limited to: computers, mainframes, a single network server, a cloud composed of multiple network server sets or multiple servers. Cloud as used herein is formed by a massive amount of computers or network servers based on cloud computing, wherein cloud computing is a type of distributed computing, which is a virtual super computer composed of a group of loosely coupled computer sets.

Specifically, in step S11, the first user equipment obtains first video information, wherein the first video information comprises a video portrait. Here, the first video information is video information of the first user obtained by the first user equipment through a capture device, for example, the video information obtained by the first user through a camera during the video call, wherein the video portrait comprises a portrait in video information which may comprise a head of a person or the entirety of the person which can be captured.

Continued in the embodiment, in step S12, the video portrait in the first video information is replaced with a virtual image to generate second video information containing the virtual image.

Here, the virtual image comprises some other images of the video portrait, for example, some virtual characters or avatars of the virtual characters, such as Superman, Iron Man, etc.

In one embodiment, replacing the video portrait in the first video information with the virtual image comprises:

S121 (not shown), obtaining video frames of the first video information;

S122 (not shown), detecting the video portrait in the video frames; and

S123 (not shown), replacing the video portrait in the video frames with the virtual image.

In the embodiment, in step S121, the first user equipment obtains video frames of the first video information. Here, the first user equipment obtains each of or part of the video frames of the first video information after obtaining the first video information.

Continued in the embodiment, in step S122, the first user equipment detects the video portrait in the obtained video frames. Here, the video portrait may be detected through image recognition.

Continued in the embodiment, in step S123, the video portrait in the video frames is replaced with the virtual image. For example, replacement may be implemented by overlaying the video portrait in the video frames with the virtual image, or the like. Here, the first user equipment will replace the video portrait in each of the obtained frames with the virtual image after detecting the video portrait from each of the frames. Here, the method of replacement may be overlaying the video portrait completely or overlaying the head area of the video portrait with the virtual image. In one embodiment, when the virtual image is a head image, the head area of the video portrait is overlaid; when the virtual image is a whole body image, the video portraits may be overlaid entirely. Here, the method of replacing the video portrait with the virtual image is merely an example. Other existing methods of replacing the video portrait with the virtual image or those that may appear in the future fall within the protection scope of the present application and are incorporated herein by reference if applicable to the present application.

In one embodiment, step S122 further comprises: detecting real-time motion information of the video portrait. Step S123 comprises: replacing the video portrait in the video frames with the virtual image based on the real-time motion information.

Specifically, in the embodiment, after detecting the video portrait in the video frames, the real-time motion information of the video portrait may also be detected. For example, the real-time motion information comprises mouth motions, body motions, or the like. Further, in step S123, based on the motion information, the video portrait in the video frames is replaced with the virtual image. For example, when the real-time motion information comprises mouth motions, the video portrait may be replaced with the virtual image according to the closing of the mouth. For example, the virtual image may close its mouth at a preset frequency. Alternatively, when real-time motion information comprises body motions, the corresponding body motions, such as waving hands, etc., may also be performed at a preset frequency.

In embodiment, the virtual image matches the motion information. In the embodiment, the mouth motions, or the body motions, or the like, of the virtual image are consistent with the motions of the video portrait. For example, when the video portrait opens his/her mouth, the virtual image also opens its mouth, that is, when the video portrait is replaced per frame, the corresponding body part in the virtual image shall be consistent with the video portrait. For example, the closing of its mouth shall be consistent with the closing of the mouth of the video portrait.

In one embodiment, step S123 comprises: detecting difference information between a subsequent frame and a previous frame of the video frames; determining a virtual image for the video portrait in the subsequent frame based on the difference information and the virtual image after replacement in the previous frame; replacing the video portrait in the subsequent frame with the virtual image.

In the embodiment, the difference information is used to represent difference between frames. Accordingly, the replacement operation may be simplified according to the difference information between the subsequent video frame and the previous video frame. For example, when it is detected that the video portrait just started to open his/her mouth in the previous frame and also opens his/her mouth in several subsequent frames, the video portrait may be replaced with a virtual image according to the difference information of the opening of the mouth between the subsequent frames and the previous frame. When replacing with the virtual image, the mouth in the subsequent frames are adjusted correspondingly in sequence according to the difference information, for example, the mouth is opened with a certain degree.

In one embodiment, replacing the video portrait in the first video information with the virtual image comprises: when a trigger condition is met, replacing the video portrait in the first video information with the virtual image.

In the embodiment, only when the trigger condition is met, the first user equipment replaces the video portrait in the first video information with the virtual image. In one embodiment, the trigger condition comprises at least one of: 1) obtaining instruction information on local replacement; 2) a device condition reaching a preset value; and 3) workload of replacing the video portrait being below a threshold.

For trigger condition 1), whether to perform a local replacement operation may be set at a user equipment, and the user may perform an operation of inputting instruction information. When the first user equipment obtains the instruction information on the local replacement, the operation of replacing the video portrait with the virtual image will be performed at the first user equipment.

For trigger condition 2), when a device condition reaches a preset value, the replacement operation will also be performed at the first user equipment. Here, the device condition is determined comprehensively according to factors such as the remaining power or memory usage of the user equipment itself, etc. When the device condition reaches the preset value, the first user equipment will perform the replacement operation locally.

For trigger condition 3), when the workload of replacing the video portrait is below a threshold, the replacement operation will also be performed at the first user equipment. Here, the workload includes overhead of replacing the video portrait, such as time spent on replacement, etc. Alternatively, the workload may be measured by a size of the video. Only when the workload is below the threshold, the first user equipment will perform the replacement.

In one embodiment, the method further comprises: S14 (not shown), the first user equipment transmitting a replacement request to the network device, and the network device replaces a video portrait in video information sent by the second user equipment with a virtual image based on the replacement request; receiving the video information of the second user equipment after replacement which is sent by the network device.

In the embodiment, a user at the first user equipment may also achieve replacement of a video portrait for a user of the counterpart terminal. For example, a user of a local terminal may transmit a replacement request to a network device through the first user equipment, and the network device replaces a video portrait in video information sent by the second user equipment with a virtual image based on the replacement request. For example, if a user favors "Iron Man", a video portrait for a user of a counterpart terminal of the video call may be replaced with "Iron Man". This enables the user of the local terminal to set a virtual image for the user of the counterpart terminal during the video call. This enables the user of the local terminal to watch the virtual image which he/she favors and achieves better user experience.

In one embodiment, before replacing the video portrait in the first video information with the virtual image, the method further comprises: S15 (not shown), determining the virtual image.

In one embodiment, step S15 comprises: determining the virtual image based on the user's selection operation.

In the embodiment, a user may select a virtual image which he/she favors, and a user equipment determines a virtual image based on user's selection, and thus replacement is achieved.

In one embodiment, step S15 comprises: detecting emotional information of the video portrait; determining the virtual image based on the emotional information.

In the embodiment, a virtual image matching emotional information of a user may be determined by detecting the emotional information. For example, when it is detected that a user in a video is in a happy state, multiple virtual images with happy expressions are recommended for the user. Then the user selects and finalizes a virtual image or a virtual image with a happy expression may be directly determined for the user.

Here, the method of detecting the emotional information of the user may be implemented by obtaining expression information or voice information of the user in the video etc. For example, if it is detected that the user expresses laugh, it is suggested that the user is in a happy state, or the like. Here, the method of detecting the emotional information of the user is merely an example. Other existing methods of detecting the emotional information or those that may appear in the future fall within the protection scope of the present application and are incorporated herein by reference if applicable to the present application.

FIG. 2 shows a method for a video call based on a virtual image at a network device according to another aspect of the present application. The method comprises:

S21, obtaining first video information sent by a first user equipment, wherein the first video information comprises a video portrait for a first user corresponding to the first user equipment;

S22, replacing the video portrait in the first video information with a virtual image to generate second video information containing the virtual image; and S23, transmitting the second video information to a second user equipment, to achieve the video call between the first user equipment and the second user equipment.

In the embodiment, in step S21, the network device obtains first video information sent by a first user equipment.

Here, after the first user equipment establishing a video call with the second user equipment, the first user equipment will transmit the obtained first video information of the user to the network device.

Further, in step S22, the network device replaces the video portrait in the first video information with a virtual image after obtaining the first video information. Here, the virtual image may be selected and determined by the user, or may also be determined by the network device according to emotional information of the video portrait.

In one embodiment, replacing the video portrait in the first video information with the virtual image comprises: S221 (not shown), obtaining video frames of the first video information; S222 (not shown), detecting real-time motion information of the video portrait in the video frames; S223 (not shown), replacing the video portrait in the video frames with a virtual image which matches the real-time motion information.

In the embodiment, the real-time motion information includes but is not limited to mouth motions, body motions, or the like. The mouth motions, or the body motions, or the like, of the virtual image are consistent with motions of the video portrait. For example, when the video portrait opens his/her mouth, the virtual image also opens its mouth, that is, when the video portrait is replaced per frame, the corresponding body part in the virtual image shall be consistent with the video portrait. For example, the closing of its mouth shall be consistent with the closing of the mouth of the video portrait.

In one embodiment, the method further comprises: detecting difference information between real-time motion information in a subsequent frame and in a previous frame of the video frames, and then generating a virtual image for the video portrait in the subsequent frame based on the difference information and the virtual image after replacement in the previous frame.

In the embodiment, the replacement operation may be simplified by the difference information. For example, when it is detected that the video portrait just started to open his/her mouth in the previous frame and also opens his/her mouth in several subsequent frames, the video portrait may be replaced with a virtual image according to the difference information of the opening of the mouth between the subsequent frames and the previous frame. When replacing with the virtual image, the mouth in the subsequent frames are adjusted correspondingly in sequence, according to the difference information, for example, the mouth is opened with a certain degree.

In addition, other method steps mentioned in the embodiment described in FIG. 1 may also be used in this embodiment, and thus will not be described herein again.

Continued in the embodiment, the network device transmits the second video information to a second user equipment, to achieve the video call between the first user equipment and the second user equipment. That is, the network device transmits the video information after replacement to the second user equipment, to achieve the video call based on the virtual image between the first user equipment and the second user equipment.

Compared with the prior art, the present application obtains first video information, and replaces a video portrait in the first video information with the virtual image, to determine second video information containing the virtual image. In this way, pleasure of communication can be increased and communication effect can be improved by using the virtual image in the video call, and thereby use experience of a user is enhanced and enriched.

Moreover, in the present application, emotional information of the video portrait may also be detected, and the virtual image may be determined based on the emotional information. In this way, virtual images which match users' emotions can be determined for users, and the users can express their emotions better in the video call and feel emotional states of both parties. This brings them closer to each other and achieves better communication effect.

In addition, in the present application, a virtual image for a counterpart party of the video call may also be selected and set, and the network device replaces the video portrait for the counterpart party of the video call with a virtual image which a user of a local terminal wishes after obtaining video information of the counterpart party. This enables the user of the local terminal to watch the virtual image which he/she favors and achieves better user experience.

In addition, in an embodiment of the present application, it is also provided a computer readable medium having computer readable instructions stored thereon, the computer readable instructions being executable by a processor to implement the above mentioned methods.

An embodiment of the present application also provides a first user equipment for a video call based on a virtual image. The first user equipment comprises:
one or more processors; and
a memory storing computer readable instructions, wherein the computer readable instructions, when executed, cause the processor to perform the operations of the above mentioned methods.

For example, the computer readable instructions, when executed, cause the one or more processors to: obtain first video information, wherein the first video information comprises a video portrait for a first user; replace the video portrait in the first video information with a virtual image to generate second video information containing the virtual image; and transmit the second video information to a network device.

In addition, an embodiment of the present application also provides a network device for a video call based on a virtual image. The network device comprises:
one or more processors; and
a memory storing computer readable instructions, wherein the computer readable instructions, when executed, cause the processor to perform the operations of the above mentioned methods.

For example, the computer readable instructions, when executed, cause the one or more processors to: obtain first video information sent by a first user equipment, wherein the first video information comprises a video portrait for a first user corresponding to the first user equipment; replace the video portrait in the first video information with a virtual image to generate second video information containing the virtual image; and transmit the second video information to a second user equipment, to achieve the video call between the first user equipment and the second user equipment.

The present application is not limited to the details of the above-mentioned exemplary embodiments, and the present application can be implemented in other specific forms without departing the spirit or basic features of the present application. Therefore, the present embodiments are to be considered as illustrative and not restrictive. The scope of the present application is defined by the appended claims rather than the above-mentioned description, and therefore it is intended that all changes which fall within the meaning and range of equivalency of the claims are embraced in the present application. Any reference signs in the claims should not be construed as limiting the claims involved. In addition, it is apparent that the word "comprising" does not exclude other elements or steps, and the singular does not exclude the plural. A plurality of units or means stated in the apparatus claims may also be implemented by one unit or means by means of software or hardware. The terms first and second and the like are used to represent names and do not represent any particular order.

What is claimed is:

1. A method for a video call based on a virtual image at a first user equipment, the method comprising:
   obtaining first video information, wherein the first video information comprises a video portrait for a first user;
   replacing the video portrait in the first video information with a virtual image to generate second video information containing the virtual image; and
   transmitting the second video information to a network device, and the network device transmits the second video information to a second user equipment corresponding to a second user;
   transmitting a replacement request to the network device, such that the network device replaces a video portrait in video information sent by the second user equipment with a virtual image based on the replacement request, wherein the virtual image is set by the first user; and
   receiving the video information of the second user equipment after replacement which is sent by the network device.

2. The method according to claim 1, wherein the replacing of the video portrait in the first video information with the virtual image, further comprising:
   when a trigger condition is met, replacing the video portrait in the first video information with the virtual image.

3. The method according to claim 2, wherein a trigger condition comprises at least one of:
   obtaining instruction information on local replacement;
   a device condition reaching a preset value; and
   workload of replacing the video portrait being below a threshold.

4. The method according to claim 1, wherein before the replacing of the video portrait in the first video information with the virtual image, the method further comprising:
   determining the virtual image.

5. The method according to claim 4, wherein the step of determining the virtual image comprising:
   determining the virtual image based on user's selection operation.

6. The method according to claim 4, wherein the determining of the virtual image further comprising:
   detecting emotional information of the video portrait; and
   determining the virtual image based on the emotional information.

7. The method according to claim 1, wherein the replacing of the video portrait in the first video information with the virtual image further comprising:
   obtaining video frames of the first video information;
   detecting the video portrait in the video frames; and
   replacing the video portrait in the video frames with the virtual image.

8. The method according to claim 1, wherein the replacing of the video portrait in the first video information with the virtual image further comprising:
   obtaining video frames of the first video information;
   detecting real-time motion information of the video portrait in the video frames; and replacing the video portrait in the video frames with a virtual image which matches the real-time motion information.

9. The method according to claim 8, wherein the method further comprising:
  detecting difference information between real-time motion information in a subsequent frame and in a previous frame of the video frames;
  wherein replacing the video portrait in the video frames with the virtual image which matches the real-time motion information comprises:
  generating a virtual image for the video portrait in the subsequent frame based on the difference information and the virtual image after replacement in the previous frame.

10. A method for a video call based on a virtual image at a network device, the method comprising:
  obtaining first video information sent by a first user equipment, wherein the first video information comprises a video portrait for a first user corresponding to the first user equipment;
  replacing the video portrait in the first video information with a virtual image to generate second video information containing the virtual image;
  transmitting the second video information to a second user equipment;
  receiving a replacement request sent by the first user equipment; and
  replacing a video portrait in the video information sent by the second user equipment with a virtual image based on the replacement request, wherein the virtual image is set by the first user.

11. The method according to claim 10, wherein before the replacing of the video portrait in the first video information with the virtual image, the method further comprising:
  determining the virtual image.

12. The method according to claim 11, wherein the determining of the virtual image further comprising:
  determining the virtual image based on user's selection operation.

13. The method according to claim 11, wherein the determining of the virtual image further comprising:
  detecting emotional information of the video portrait; and
  determining the virtual image based on the emotional information.

14. The method according to claim 10, wherein the replacing of the video portrait in the first video information with the virtual image further comprising:
  obtaining video frames of the first video information;
  detecting the video portrait in the video frames; and
  replacing the video portrait in the video frames with the virtual image.

15. The method according to claim 10, wherein the replacing of the video portrait in the first video information with the virtual image further comprising:
  obtaining video frames of the first video information;
  detecting real-time motion information of the video portrait in the video frames; and
  replacing the video portrait in the video frames with a virtual image which matches the real-time motion information.

16. The method according to claim 15, wherein the method further comprising:
  detecting difference information between real-time motion information in a subsequent frame and in a previous frame of the video frames;
  wherein replacing the video portrait in the video frames with the virtual image which matches the real-time motion information comprises:
  generating a virtual image for the video portrait in the subsequent frame based on the difference information and the virtual image after replacement in the previous frame.

17. A first user equipment for a video call based on a virtual image, the first user equipment comprising:
  one or more processors; and
  a memory storing computer readable instructions, wherein the computer readable instructions, when executed, cause the processor to perform operations as following:
  obtaining first video information, wherein the first video information comprises a video portrait for a first user;
  replacing the video portrait in the first video information with a virtual image to generate second video information containing the virtual image;
  transmitting the second video information to a network device, and the network device transmits the second video information to a second user equipment corresponding to a second user;
  transmitting a replacement request to the network device, such that the network device replaces a video portrait in video information sent by the second user equipment with a virtual image based on the replacement request, wherein the virtual image is set by the first user; and
  receiving the video information of the second user equipment after replacement which is sent by the network device.

* * * * *